United States Patent
Lang et al.

(10) Patent No.: US 12,314,367 B2
(45) Date of Patent: May 27, 2025

(54) SELF-CREATION AND SELF-ADMINISTRATION OF LOCAL USER AUTHENTICATION ACCOUNTS OPERABLE DURING NETWORK DISRUPTIONS

(71) Applicant: Xerox Corporation, Norwalk, CT (US)

(72) Inventors: Joseph H. Lang, Webster, NY (US); Timothy L. Dioguardi, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 876 days.

(21) Appl. No.: 17/517,710

(22) Filed: Nov. 3, 2021

(65) Prior Publication Data

US 2023/0140229 A1    May 4, 2023

(51) Int. Cl.
G06F 21/34    (2013.01)
G06F 21/00    (2013.01)
G06F 21/45    (2013.01)
G06F 21/60    (2013.01)

(52) U.S. Cl.
CPC .............. *G06F 21/34* (2013.01); *G06F 21/45* (2013.01); *G06F 21/604* (2013.01)

(58) Field of Classification Search
CPC ........ G06F 21/45; G06F 21/604; G06F 21/30; G06F 21/31; G06F 21/34; G06F 21/608
See application file for complete search history.

(56) References Cited

U.S. PATENT DOCUMENTS

| | | | |
|---|---|---|---|
| 7,540,416 B2 | 6/2009 | Hong et al. | |
| 7,958,245 B2 | 6/2011 | Thomas et al. | |
| 8,307,414 B2 | 11/2012 | Zerfos et al. | |
| 8,555,344 B1 | 10/2013 | Wiedmann et al. | |
| 9,811,646 B2 | 11/2017 | Baentsch et al. | |
| 10,454,896 B2 | 10/2019 | Soliman et al. | |
| 10,761,793 B2 | 9/2020 | Nishikawa | |
| 2017/0011207 A1* | 1/2017 | Takeda | G06F 21/31 |
| 2018/0335990 A1* | 11/2018 | Nishikawa | H04L 63/102 |

OTHER PUBLICATIONS

"Employing the LDAP Authentication," https://manuals.konicaminolta. eu/bizhub-C554-C454-C364-C284-C224/EN/contents/id08-0369. html, Accessed on Sep. 23, 2021, pp. 1-6.

* cited by examiner

*Primary Examiner* — Edward Zee
(74) *Attorney, Agent, or Firm* — Gibb IP Law Firm, LLC

(57) ABSTRACT

User identification information is received through a user interface device. A processor device supplies the user identification information through an input/output device to an external computerized device to receive, in response, external authorization to use features of an apparatus. The user interface device outputs a menu having options to create a local account based on the external authorization and, in response, receives instructions to create a local account using the processor device. The local account is created based on the instructions being received using the processor device. The local account is stored in a memory device. After creation of the local account, the processor device generates local authorization to use the features of the apparatus based on the user identification information matching information in the local account stored in the memory device, without contacting the external computerized device for the external authorization.

30 Claims, 7 Drawing Sheets

SELF-CREATION AND SELF-ADMINISTRATION OF LOCAL USER AUTHENTICATION ACCOUNTS OPERABLE DURING NETWORK DISRUPTIONS

BACKGROUND

Systems and methods herein generally relate to authentication of users of devices such as printing devices and more particularly to authentication issues relating to network disruptions.

Rudimentary machines exist happily with simplified controls such as simple start and stop buttons; however, as device sophistication and value increases, it becomes more useful to restrict user access and rights. While not being limited thereto, this disclosure uses examples of printing devices and multi-function devices (MFD) that can perform varied document processing actions such as printing, scanning, faxing, emailing, formatting, etc. Simplified document handling devices often have limited controls, while more complex devices require that a user be authenticated before use, where different users may have different access rights to the various features and functions that an MFD may offer.

To perform user authentication, more sophisticated devices connect to an external computer (e.g., authentication server) through a wide area network (e.g., cloud, private network, etc.). The use of external authentication servers provides users access to many different machines without requiring local accounts to be established on every individual machine. System administrators can efficiently set policies and access options for individual users or groups of users by interacting with the external authentication servers; however, it is highly inefficient for system administrators to manage local accounts created on individual devices.

These gains in efficiency promote using authentication servers over local accounts when providing access to controlled devices. Additionally, self-establishment of local accounts may not be allowed because users may provide incorrect information or settings which, if not monitored by system administrators, can result in unauthorized access.

Therefore, many systems only permit access to local devices after network authentication through a remote authentication server. Unfortunately, this can result in situations where users cannot be authenticated when the server cannot be reached by the local device. Therefore, if network connectivity problems arise or if the authentication server malfunctions, users may not be granted access to features of local machines, even if the local machine itself is functioning properly.

SUMMARY

Methods herein receive user identification information through a user interface device of an apparatus. Additional (or repetitive) elements of the user identification information can be obtained through a card reader of the apparatus. These methods also supply (using a processor device of the apparatus) the user identification information through an input/output device of the printing apparatus to an external computerized device to receive, in response, external authorization to use features of the apparatus.

Such methods output (through the user interface device) a menu having options to create a local account based on the external authorization and, in response, receive (through the user interface device) instructions to create a local account using the processor device. With methods herein, the processor receives instructions to enable or disable use of the local account from the external computerized device. Methods herein can also output (through the user interface device) a menu having options to register a user authentication card with the local account using the card reader.

The methods herein store the local account in a memory device of the apparatus. These methods can also synchronize the local account with authentication information maintained in the external computerized device using the input/output device. Additionally, these methods can periodically de-authenticate the local account from the memory device after expiration of a non-use time limit using the processor device.

After creation of the local account, these methods generate (using the processor device) local authorization to use the features of the apparatus based on the user identification information matching information in the local account stored in the memory device, without contacting the external computerized device for the external authorization.

Apparatuses herein include (among other components) a user interface device, a memory device, an input/output device, a card reader, etc. (all operatively connected to a processor device). The input/output device is adapted to communicate with an external computerized device. The user interface device is adapted to receive user identification information. The processor device is adapted to obtain redundant or additional elements of the user identification information through the card reader.

The processor device is adapted to supply the user identification information through the input/output device to the external computerized device to receive, in response, external authorization to use the features of the apparatus. Based on the external authorization, the user interface device is adapted to output a menu having options to create a local account using the processor and, in response, the user interface device is adapted to receive instructions to create a local account using the processor.

The user interface device is adapted to output a menu having options to register a user authentication card with the local account using the card reader. The memory device is adapted to store the local account. Further, the memory device is adapted to store multiple local accounts, and each of the local accounts stores authentication and rights information of a single user.

The processor device is adapted to receive instructions to enable or disable use of the local account from the external computerized device. The processor device is adapted to de-authenticate the local account from the memory device after expiration of a non-use time limit. The processor device is adapted to synchronize the local account with authentication information maintained in the external computerized device using the input/output device.

After creation of the local account, the processor device is adapted to generate local authorization to use the features of the apparatus based on the user identification information matching information in the local account stored in the memory device, without contacting the external computerized device for the external authorization.

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

Figure 1A:
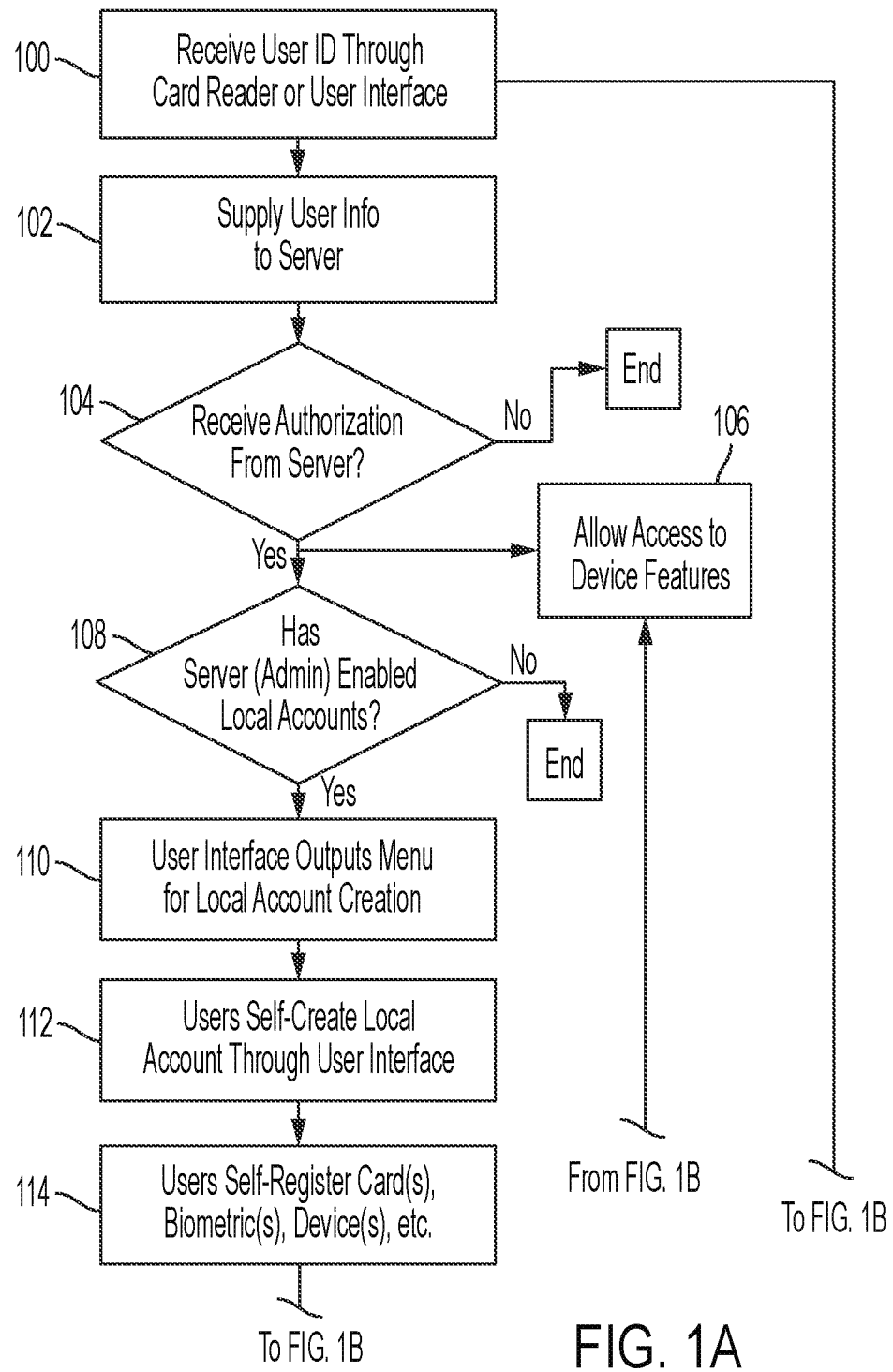
FIGS. 1A-1B are flow diagrams of various methods herein.

As mentioned above, gains in efficiency encourage using remote authentication through network-connected authentication servers over self-established local accounts or system administrator maintained local accounts when providing access to individual devices. Unfortunately, this can result in situations where users cannot be authenticated if the authentication server cannot be reached by the local device. In view of these issues, the authentication systems and methods herein enable local accounts to be self-created and self-administered by the user, so long as the user has been first authenticated by the authentication server and the system administrator has previously allowed local account self-creation and self-administration.

Once a user has self-created a local account, the user can gain access to the local device even if the authentication server is unavailable. Thus, the systems and methods herein utilize the efficiency of having a system administrator control device access only through the authentication server, while still providing the convenience of granting access to a local device when the authentication server is unavailable (for those users that have previously established a self-created local account).

Additionally, by only permitting local account self-creation after a user has been authenticated by the authentication server (during an active authentication session) the settings from the user's account maintained by the authentication server can be cloned into the self-created local account. This saves the user from having to manually enter all their information and ensures that the information within the local account is consistent with the information maintained by the authentication server. This allows users to self-create local accounts yet avoids issues that can arise when users provide incorrect information or settings which, if not monitored by system administrators, can result in unauthorized access.

In this way, the locally self-created account can be a clone of (e.g., is identical to or exactly matches) the account maintained by the authentication server. Even though the system administrator only interacts with the network-connected authentication server to keep operations efficient, the systems and methods disclosed here ensure that the user will be subjected to the same rigor of authentication when accessing the self-created local account as they would be subjected to when proceeding through the authentication server. Further, when accessing local accounts, users only have the rights within the local account that have been granted in the account maintained on the authentication server, without the system administrator having to monitor the self-created local accounts maintained on each individual device.

With systems and methods herein, the users can also self-register (or self-update) smart cards, proximity cards, and user devices (e.g., smartphones, portable devices, wearables, etc.) with the local account, as well as record biometric information with the local account (if the local device contains one or more card readers, biometric devices, wireless communication equipment, etc.). This allows different authentication methods to be self-established and maintained by the user within the user's local account without involving the system administrator.

Additionally, the local accounts can be periodically synchronized with the accounts maintained on the authentication server. This permits passwords, cards, devices, biometrics, etc., to be updated and consistently maintained on both the local accounts and the authentication server. Additionally, any authentication methods (e.g., cards, user devices, biometrics, etc.) self-registered or self-updated to local accounts by users can be imported to the user's account maintained on the authentication server to keep the local and server-maintained accounts consistent with one another.

The systems and methods disclosed here can further require that local accounts re-authenticate after non-use periods expire. If accounts go unused for additionally longer periods, they can be automatically deleted from the local devices to free up processing and storage resources of the local devices. System administrators have additional options of removing local accounts and establishing settings of whether local accounts can be utilized by specific users or can be established on specific devices by changing settings on the authentication server (e.g., disabling local accounts followed by re-enablement of the local accounts can clear all current local accounts, for example).

Therefore, as explained in greater detail below, the processing herein maintains high efficiency by limiting the system administrator's interaction to only the authentication server while still allowing control of the establishment and updating of local accounts self-created and self-administered by the users.

Figure 1B:
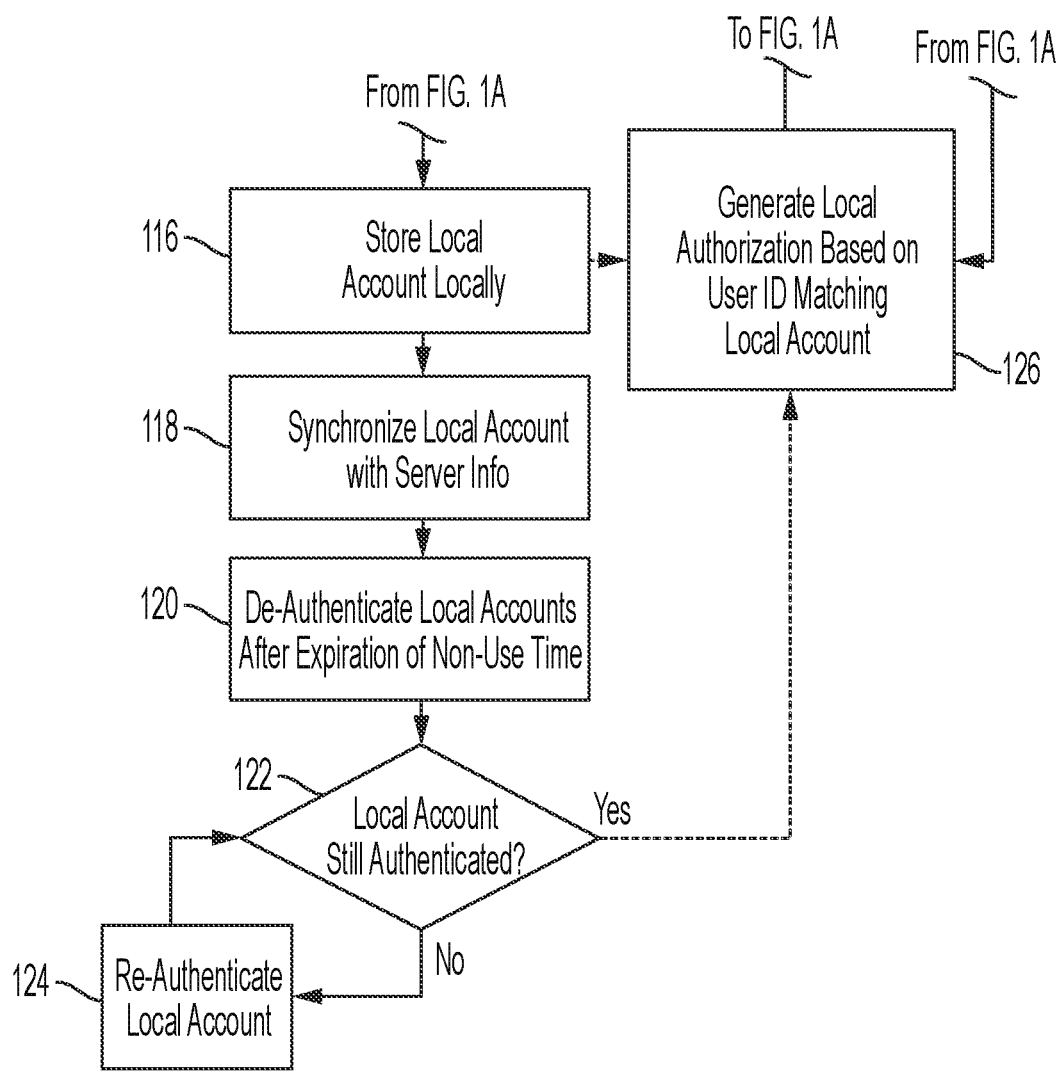

Referring now to the drawings, FIGS. 1A-1B are a flowchart illustrating some aspects of exemplary methods herein. In item 100, these methods receive user identification information through what is referred to herein generically as a "user interface device" of a local apparatus. The user identification information can be a password, access code, username, user number, and/or badge number, etc., or any other data specified by a system administrator as being required for authentication.

The user interface devices herein, can be, for example: a keyboard, keypad, touch screen, etc., through which the user manually enters their user identification information; a card reader to which a user supplies a proximity card, smart card, etc.; a wireless communications device adapted to communicate with a user's portable computerized device (e.g., smart phone, portable device, wearable device, etc.) through which the user supplies their user identification information; and/or a biometric reader device (e.g., fingerprint reader, retinal scanner, face recognition camera, microphone, etc.) that can identify a user by presentation of a body part or by speaking; etc.

In item 102, these methods supply (using a processor device of the local apparatus) the user identification information to a network-connected external computerized device (e.g., at least one server) through an input/output device of the local apparatus to receive, in response (in item 104) external authorization from the external computerized device that permits the user to use features of the local apparatus in item 106. However, if authorization is denied by the server or the local apparatus is unable to contact the external computerized device (e.g., because of network problems or because the external computerized device is malfunctioning) in item 104, processing ends, and access is not provided to any features of the local apparatus in 106 and local accounts are not created as discussed below.

As shown in item 108, with methods herein the processor receives instructions to enable or disable use of local accounts from the server (that is administered by a system administrator). For example, the external computerized device maintains various options that are set by the system administrator and one of these options can be whether one or more local devices can create and maintain local accounts. Based on the settings established by the system administrator within the external computerized device, the external computerized device communicates these settings with each local device that it is in communication with. Each local device maintains the settings provided from the external computerized device (e.g., by setting flags, enabling or disabling routines or sub-routines, etc.) until the settings are next updated or changed by the external computerized device.

The externalized computerized device can set such flags within the local devices, for example, during periods of low network utilization, during startup, or each time the system administrator changes settings. Thus, the external computerized device can contact the local device through the computerized network and compare the local flags with the settings maintained by the external computerized device. This can occur, for example, every few hours, days, weeks, etc., depending upon utilization or each time a setting is established or revised by the system administrator.

In some examples, all local devices can be allowed to create and maintain local accounts. In other options, some local devices may not be allowed to utilize local accounts. For example, certain types or classes of devices may be not permitted to establish local accounts, devices in certain geographic locations may not be permitted to establish local accounts, and/or devices maintained by specific organizations may not be permitted to establish local accounts, etc.

If the system administrator does not authorize local accounts in item 108 (the settings within the local device do not permit creation or maintenance of local accounts) processing relating to local accounts ends and use of the features of the device 106 is only allowed if there is remote server authorization in item 104. If authorization from the server has been received in item 104 and creation/maintenance of local accounts is enabled in item 108, such methods proceed to item 110 to output (through the user interface device) a menu having options for individual users to self-create and/or maintain their own local account.

In response, these methods receive (back through the user interface device) instructions from the users to self-create or revise the local accounts in item 112 (using the processor device) and information from the external authentication server. As noted above, after a user has been authenticated by the authentication server (during an active authentication session) in item 112 the settings and all other data from the user's account maintained by the authentication server can be cloned into the self-created local account. Methods herein can optionally mandate that the locally self-created account be a clone of (e.g., is identical to or exactly matches) the account maintained by the authentication server and not allow the user to change any of the settings/data imported from the authentication server.

Such methods can also output (through the user interface) another menu having options for the user to self-register a user authentication card (e.g., proximity cards, smartcards, etc.), biometrics, or user devices (e.g., smartphones, wearable devices, etc.) with the local account using a card reader, biometric devices, microphone, local communication devices, etc., of the local device's user interface in item 114. Thus, item 114 allows users to add authentication methods without the local apparatus having to be connected to the external computerized device, with restrictions as to what additional self-registered authentication can be utilized being controlled using flags set on the local apparatus by the external computerized device (after such global or group settings are created on the external computerized device by the system administrator).

Users can similarly re-register expired user authentication cards or register additional user authentication cards in item 114 in the future, if needed using such a menu. This provides the ability to store "non-standard" lightweight directory access protocol (LDAP) properties such as a proximity card number or other authentication unique properties on the local apparatus that are independent of LDAP.

The methods herein store the local account locally in a memory device of the local apparatus in item 116. Storing local accounts in local memory allows local authentication of the user and permits the features of the local apparatus to be used even if the external computerized device is unavailable. These methods can also periodically synchronize these local accounts with the authentication information maintained in the server using the input/output device in item 118. In this way, additional user authentication methods that users have self-registered in item 114 can be automatically exported to the external computerized device in item 118 without involving the system administrator. Further, this permits the user to use such self-registered additional authentication methods to access other devices when remote authentication is available to those other devices, so long as the other devices have the appropriate readers, etc., and can perform authentication through the external computerized device.

In item 118 during periods of low network utilization, for example, the external computerized device can contact the local device and compare the local accounts with the information maintained by the external computerized device. Thus, processing in item 118 permits passwords, etc., to be updated and consistently maintained on both the local accounts and the authentication server. Again, any authentication methods (e.g., cards, user devices, biometrics, etc.) self-registered or self-updated to local accounts by users can be imported to the user's account maintained on the authentication server to keep the local and server-maintained accounts consistent with one another, thereby permitting the user to potentially use such self-registered additional authentication methods to access other devices that are in communication with the authentication server.

As shown in item 120 these methods can periodically de-authenticate the local account from the memory device after expiration of a non-use time limit (a period of time during which the local account has not been utilized) using the processor device. Once again, various options are set by the system administrator and one of these options is whether de-authentication of local accounts should occur and how long the non-use time period shall be if de-authentication is enabled. Based on the settings established by the system administrator in the external computerized device, the external computerized device communicates these settings to each local device that it is in communication with. Each local device maintains the settings provided from the external computerized device (e.g., by setting flags, etc.) until the settings are next updated or changed by the external computerized device. Thus, global server settings can establish that all local devices (or device group settings can establish that select groups of devices (e.g., grouped by type, geographic region, entity, etc.)) have de-authentication flags and non-use timers.

Further, other timers can be set by the system administrator where, for example in order to reduce local device memory resource utilization, local accounts can be deleted from the local devices if they remain unused for a longer time period (that will generally equal or exceed the de-authentication time period). Thus, in one example the de-authentication time period could be set for one or more weeks or one month of user inactivity, while the account deletion time period could be set for many months (e.g., 3 months) or a year or more. Again, such global or group options are set by the system administrator changing settings within the external computerized device, which the external computerized device communicates to the local devices through the computerized network, and this avoids requiring the system administrator to individually administer local accounts on individual local devices, yet still allows users to self-establish local accounts for use when networks are down.

Item 122 checks to see if a local account is still authenticated and, if not, allows reauthentication of the local account in item 124. The reauthentication process 124 is performed only during an active authentication session with the external computerized device and can use the user identification information supplied in item 100 (and this reauthentication process can be automatic once the user has supplied the identification information in item 100). In alternatives, the reauthorization process 124 can require the user to manually resupply their identification information, change their password, supply a different smart card or proximity card, supply a new biometric reading, etc., again depending upon reauthentication requirements that the system administrator may establish as flag settings within the local device (possibly through global and/or group settings set by the system administrator in the external computerized device).

In item 126, in response to the receipt of user identification information in item 100, these methods can directly generate (using the processor device) local authorization to use the features of the local apparatus (item 106) based only on the user identification information input in item 100 matching information in the local account stored in the memory device (item 116) and the local account still be authenticated (item 122). Thus, local authorization 126 can grant access to the printer 106 without contacting the external computerized device for the external authorization (e.g., bypassing items 102-104), which can be useful when network or other issues prevent the authorization from the server from being received in item 104.

Additionally, in this processing the system administrator can provide global or group settings through the external computerized device to the local devices to prefer local authorization (e.g., processing directly from item 100 to 126 and 106, when available) over external authorization (e.g., processing through 100, 102, 104, and 106) irrespective of the availability of the external computerized device or the computer network. This option can reduce network load by first attempting local authorization before accessing the computer network, and this may even provide faster authentications if network delays are present.

Figure 2:
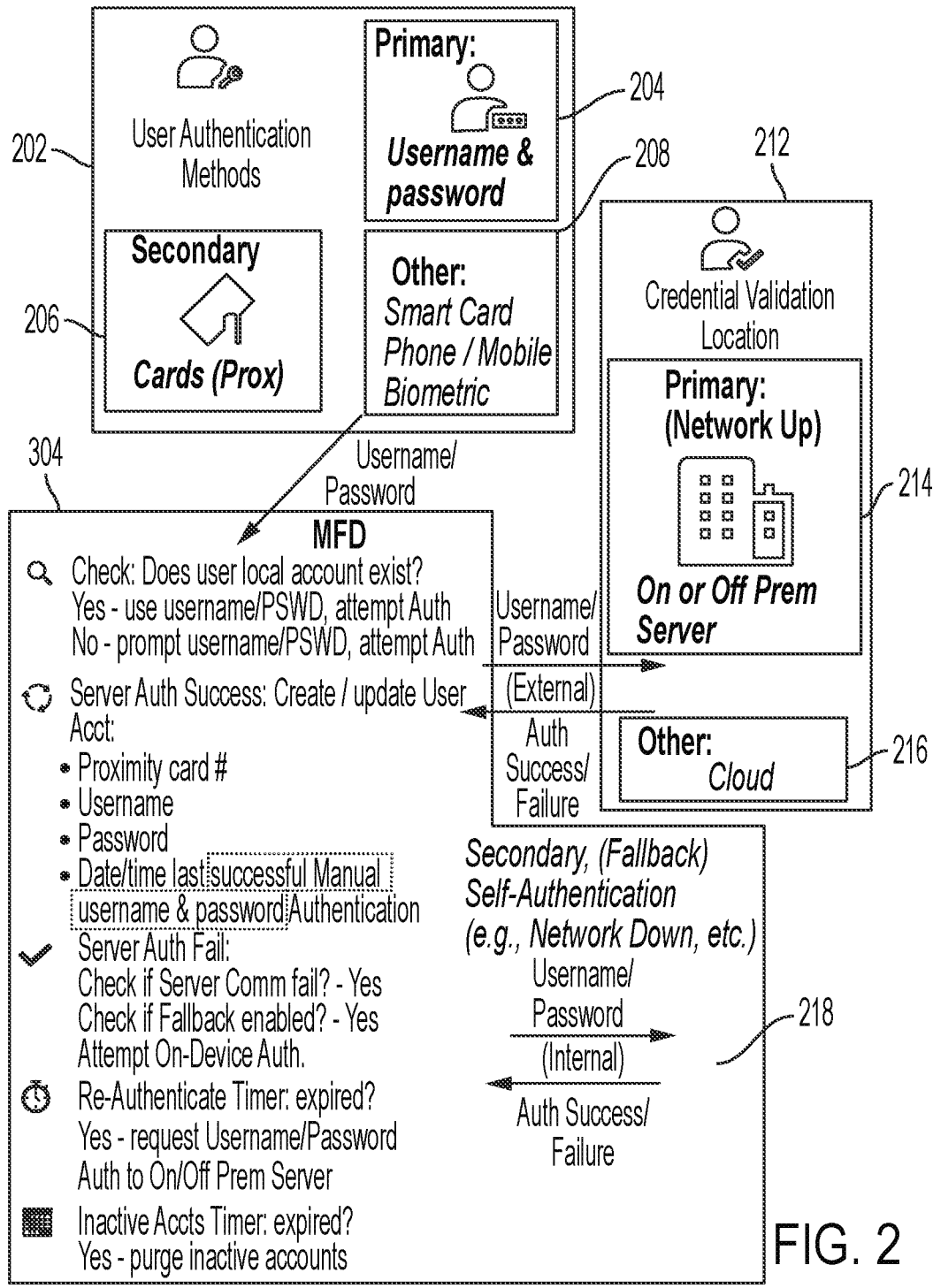
FIGS. 2-4 are conceptual drawings illustrating processing herein.

FIG. 2 conceptually illustrates various user authentication methods 202, a multi-function device (MFD) 304, and different external credential validation locations 212 available with devices and methods herein. As noted above, processing herein receives user identification information into a user interface device of the MFD 304. This user identification information can be input by a user manually entering username and password through a keyboard, touch-screen, etc. (conceptually shown in item 204). As conceptually shown in item 206 in FIG. 2, additional (or repetitive) elements of the user identification information can be obtained through a proximity card reader of the apparatus. Item 208 conceptually shows that user identification information can be supplied using smart cards, smart phones or other mobile devices, biometrics, etc.

External credential validation locations 212 can include, for example, a network connected external computerized device such as an on-premises local print server 214, a remote print server (cloud device) 216, etc. As shown conceptually using arrows between the MFD 304 and the external credential validation locations 212, the user identification information (e.g., username/password, etc.) is supplied and an authentication success or failure message is returned to permit or deny use of the MFD 304.

Alternatively, as shown conceptually in item 218, in a secondary (fallback) option (e.g., when the communications network is down) the user identification information is saved to be used internally within the MFD 304, and this self-produced authentication process generates a success or failure message internally so that the MFD 304 self-determines whether to permit usage of the MFD 304.

As shown conceptually within item 304, this processing can involve first checking whether the user has a local account. If so, the entered username password (PSWD) is used internally where the MFD 304 self-authenticates the user's access to the MFD 304, as shown conceptually in item 218. Otherwise, external authentications 212 are attempted to be used for user authentication.

As further shown conceptually in item 304, if the external authentication locations 212 provide successful authentication, the MFD 304 can create or update a local user account. This processing can create, update, and/or use proximity cards, usernames, passwords, biometrics, portable devices, and/or records of the date/time of the last successful authentication (external) server authentication using manual username/password entry, etc. The last successful authentication (external) server authentication using manual username/password entry is used to compare the current date/time against the re-authentication timer to determine when the user should be required to re-authenticate (using manual entry of username & password). If the external authentication locations 212 do not provide successful authentication, the MFD 304 can check to see if there is a server communication failure and as to whether the self-authentication 218 is enabled. If so, the MFD 304 attempts self-authentication 218.

The MFD 304 can require that local accounts (used in self-authentication 218) be periodically re-authenticated. If the timer for expiration of local accounts has expired, the MFD 304 can re-authenticate a local account if the user can supply proper user identification information (e.g., username/password) and if the external credential locations 212 can confirm such user identification information. Additionally, in order to periodically clear unused local accounts (e.g., to free up resources of the MFD 304, etc.) a potentially different timer of the MFD 304 can determine if the time allowed for inactive local accounts has expired; and, if it has, such old, unused local accounts can be purged/deleted. In one non-limiting example, the additional timer could be set to 90 days and may be otherwise configurable. If the re-authentication timer is set at 30 days (only an example), the user is forced to manually re-authenticate monthly. If they do not re-authenticate within the 90 days cleanup timer, the user local account will be deleted. This could equate to local account deletion after non-use for 120 days if the 90 day timer does not start until expiration of the 30 day timer.

Again, this is only one example and other time periods and other start times could be used depending upon user preference.

Figure 3:
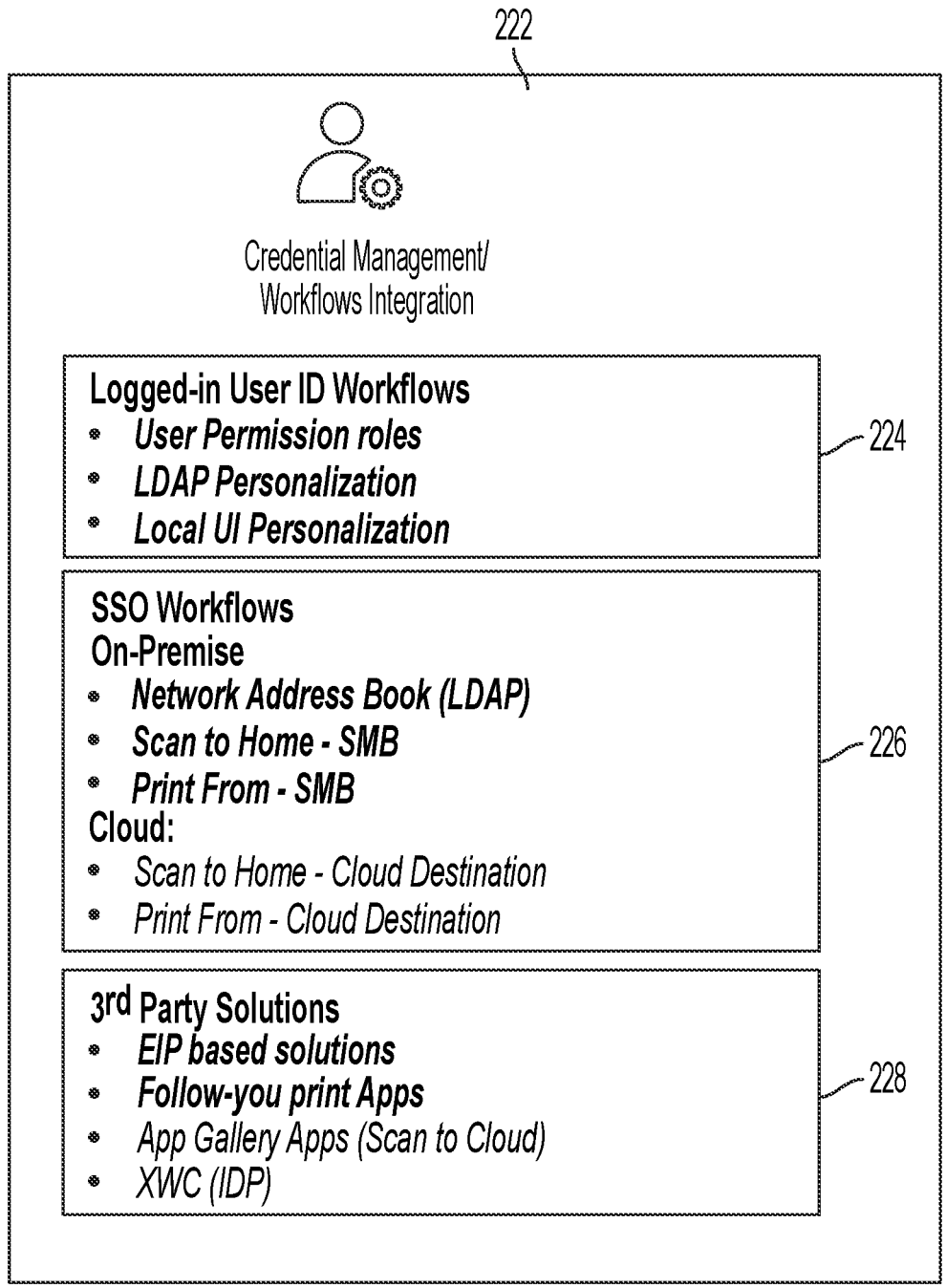

FIG. 3 conceptually illustrates credential management and workflows integration in item 222. A sub-concept within item 222 includes logged-in user identification information workflows 224. These include, for example, workflows for user permission roles, lightweight directory access protocol (LDAP) personalization, and local user interface (UI) personalization.

Another sub-concept within item 222 relates to single sign-on (SSO) workflows, as shown in item 226. These workflows can be on-premise or remote (e.g., cloud based). Specifically, the on-premise workflows use one or more address books (for LDAP), scan to home (server message block (SMB)) processing, and/or print from (SMB) processing, etc. For remote SSO workflows, this can include scan to home cloud destination processing and/or print from cloud destination processing, etc.

Additional sub-concepts shown within item 222 include third-party solutions, as shown conceptually by item 228. These can include extensible interface platform (EIP) based solutions, follow-you printing apps, app galleries (e.g., scan to cloud, etc.), and workplace clouds, etc.

Figure 4:
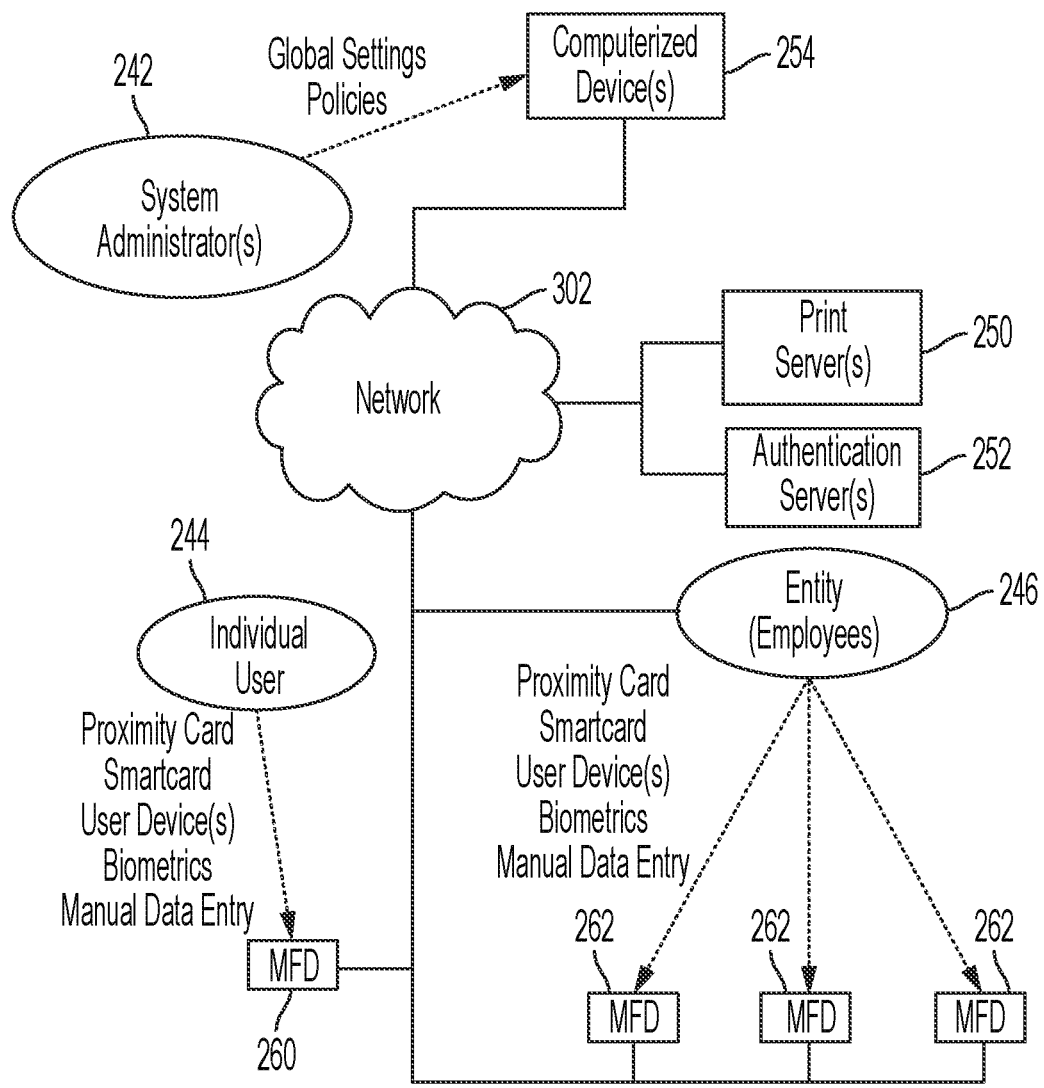

FIG. 4 conceptually illustrates processing herein where a system administrator 242 enters commands and menu selections into a computerized device 254 that is connected to a network 302. These commands and menu selections control the global settings and policies applicable to some or all resources under the system administrator's 242 control (e.g., MFDs 260, 262, print servers 250, authentication servers 252, etc.). In one specific example, the processors of the MFDs 260, 262 thereby indirectly receive instructions from the system administrator 242 (operating an external computer 254) to enable or disable certain features, such as use of the local accounts.

As also shown in FIG. 4, an individual user 244 supplies some form of user identification information through many different types of user interface devices of a MFD 260. This action can take many forms including the user 244 presenting a proximity card or smartcard to a card reader of the MFD 260, the user 244 operating user devices (smartphone, wearable device, etc.) to supply the user identification information to wireless communication devices of the MFD 260, the user 244 presenting a body part to, or speaking to, a biometric reader of the MFD 260, and/or the user manually entering user identification information by manually typing into a keyboard, keypad, or touchscreen device of the MFD 260. Similarly, employees of an entity 246 can supply the same types of user identification information to the same types of user interfaces of the entity's MFDs 262.

Processing herein also supplies (using a processor device of the MFD 260, 262) the user identification information through an input/output device of the MFD 260, 262 to an external computerized device such as a print server 250 and/or authentication server 252 to receive, in response from the print server 250 and/or authentication server 252, external authorization for the users 244, 246 to use the MFD 260, 262.

Thus, once a user 244, 246 has been authenticated through the external authorization, the processing herein can output to the user 244, 246 (through the user interface device of a MFD 260, 262) a menu having options to create a local account. In response, the user 244, 246 supplies (and the user interface receives) instructions from the user 244, 246 to create a local account on the MFD (using the processor device).

The methods herein store the local account in a memory device of the MFD 260, 262. These methods can also synchronize the local account with authentication information maintained in the external computerized device 250, 252 using the input/output device. Methods herein can output (through the user interface) a menu having options to register a user card with the local account using the card reader. Additionally, these methods can periodically de-authenticate the local account from the memory device after expiration of a non-use time limit using the processor device and require reauthentication, as discussed above.

After creation of the local account, these methods generate (using the processor device) local authorization to use the printing device 260, 262 based on the user identification information matching information in the local account stored in the memory device, without contacting the external computerized device 250, 252 for the external authorization.

Therefore, with the systems and methods herein the system administrator 242 has the power to enable/disable proximity card network authentication and enable/disable the creation of local user accounts on the MFDs 260, 262 without having to individually administer the MFDs 260, 262. This permits the user 244, 246 to self-authenticate by interacting with a local printer 260, 262 having a previously established local user account (e.g., when the remote authentication server 250, 252 is down).

Figure 5:
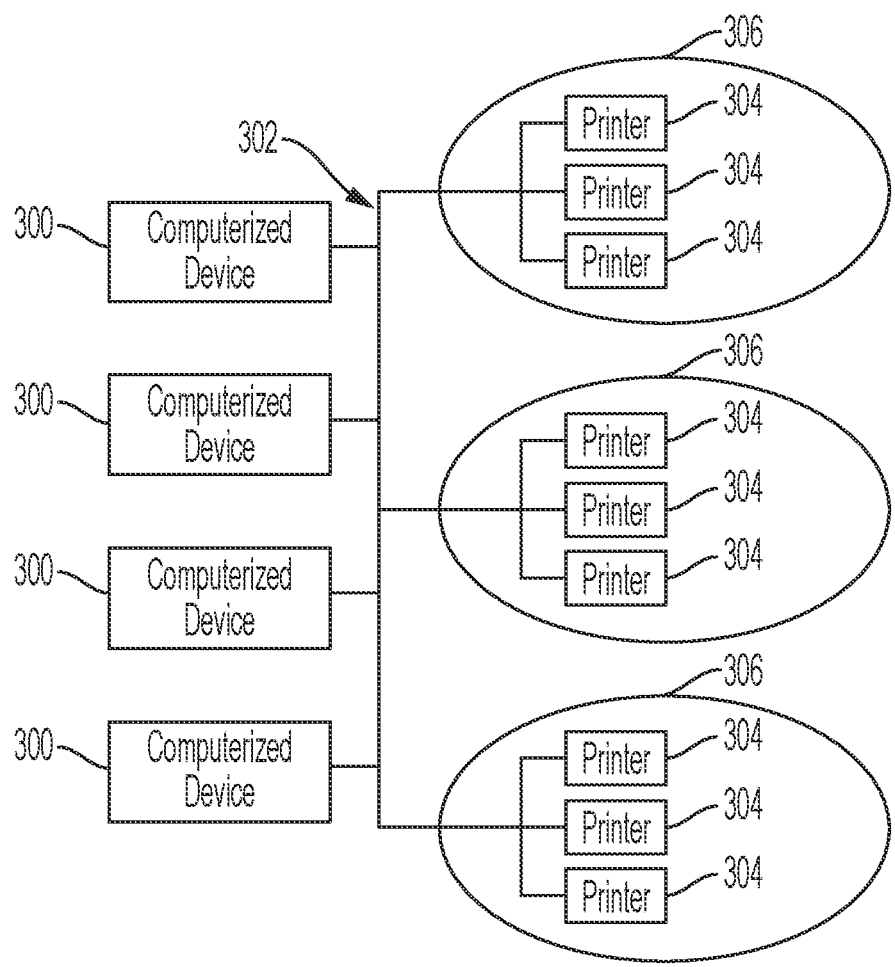
FIG. 5 is a schematic diagram illustrating systems herein.

As shown in FIG. 5, exemplary systems and methods herein include various computerized devices 300, 304 located at various different physical locations 306. The computerized devices 300 can include print servers, printing devices, personal computers, etc., and are in communication (operatively connected to one another) by way of a local or wide area (wired or wireless) network 302.

Figure 6:
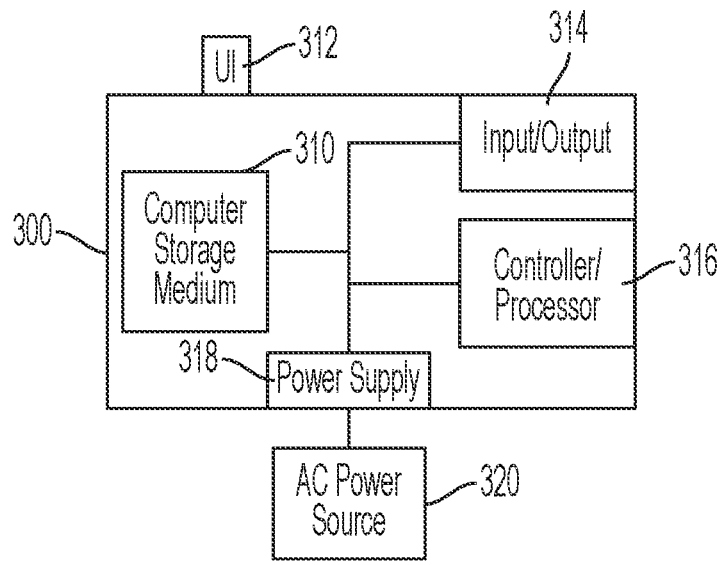
FIG. 6 is a schematic diagram illustrating devices herein.

FIG. 6 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 6, a body housing has one or more functional components that operate on power supplied from an alternating current (AC) source 320 by the power supply 318. The power supply 318 can comprise a common power conversion unit, power storage element (e.g., a battery, etc.), etc.

Figure 7:
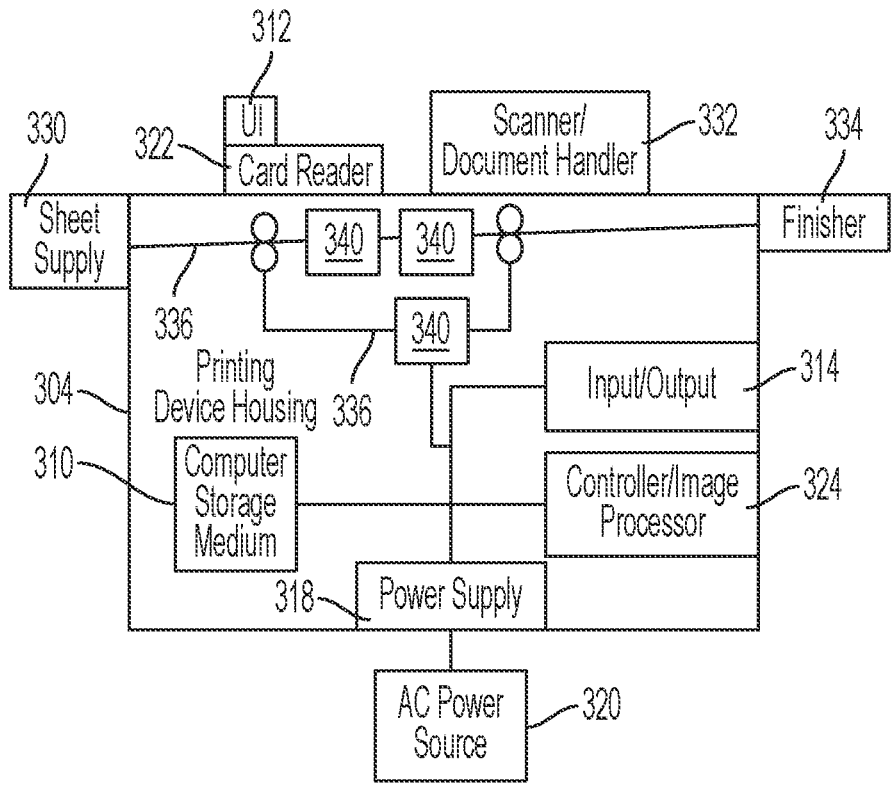
FIG. 7 is a schematic diagram illustrating devices herein.

FIG. 7 illustrates a computerized device that is a printing device 304, which can be used with systems and methods herein and can comprise, for example, a printer, copier, multi-function machine, multi-function device (MFD capable of printing, scanning, copying, faxing, emailing, etc.), etc. The printing device 304 includes many of the components mentioned above and at least one marking device (printing engine(s)) 340 operatively connected to a specialized image processor 324 (that may be different from a general purpose computer because it can be specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

The one or more printing engines 340 are intended to illustrate any marking device that applies a marking material (toner, inks, etc.) to continuous media or sheets of media, whether currently known or developed in the future and can include, for example, devices that use an ink jet imaging system or a high-speed aqueous imaging system.

Therefore, apparatuses 304 herein include (among other components) a printing device 340, a user interface device 312, a memory device 310, an input/output device 314, a card reader 322, etc. (all operatively connected to a processor device 314). Thus, apparatus 304 can be a multi-function device where the printing engine 340, the input/output device 314, and/or the scanning device 332 (when operating with the processor device 314) cause the multi-function device 304 to be adapted to perform printing, scanning, copying, and/or sending and receiving facsimiles.

The input/output device 314 is adapted to communicate with an external computerized device 300. The user interface device 312 is adapted to receive user identification information and can comprise, for example, display screen (s) and keyboard(s), touchscreen(s), card reader(s), biometric device(s), wireless communication equipment, etc.

The processor device 314 is adapted to supply the user identification information through the input/output device 314 to the external computerized device 300 to receive, in response, external authorization to use the printing device 340. Based on the external authorization, the user interface device 312 is adapted to output a menu having options to create a local account using the processor and, in response, the user interface device 312 is adapted to receive instructions to create a local account, which is created using the processor.

The user interface device 312 is adapted to output a menu having options to register a user authentication card with the local account using the card reader 322. The memory device 310 is adapted to store the local account. The memory device 310 is adapted to store multiple local accounts, and each of the local accounts stores authentication and rights information of a single user.

The processor device 314 is adapted to receive instructions to enable or disable use of the local account from the external computer. The processor device 314 is adapted to de-authenticate the local account from the memory device 310 after expiration of a non-use time limit. The processor device 314 is adapted to synchronize the local account with authentication information maintained in the external computerized device 300 using the input/output device 314.

After creation of the local account, the processor device 314 is adapted to generate local authorization to use the printing device 340 based on the user identification information matching information in the local account stored in the memory device 310, without contacting the external computerized device 300 for the external authorization.

As would be understood by those ordinarily skilled in the art, the printing devices shown here are only examples and the systems and methods herein are equally applicable to other types of printing devices that may include fewer components or more components. For example, while a limited number of printing engines and paper paths are illustrated, those ordinarily skilled in the art would understand that many more paper paths and additional printing engines could be included within any printing device used with systems and methods herein.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Additionally, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
receiving user identification information through a user interface device of an apparatus;
supplying, using a processor device of the apparatus, the user identification information through an input/output device of the apparatus to an external computerized device to receive, in response, external authorization to use features of the apparatus;
outputting, through the user interface device, a menu having options to create a local account based on the external authorization and, in response, receiving, through the user interface device, instructions to create a local account using the processor device;
creating the local account based on the instructions being received using the processor device by cloning authentication information from a user account maintained in the external computerized device;
storing the local account in a memory device of the apparatus; and
after creation of the local account, generating, using the processor device, local authorization to use the features of the apparatus based on the user identification information matching information in the local account stored in the memory device, without contacting the external computerized device for the external authorization.

2. The method according to claim 1, further comprising de-authenticating the local account from the memory device after expiration of a non-use time limit and requiring reauthentication.

3. The method according to claim 1, wherein the creating the local account is performed only in response to the external authorization being received.

4. The method according to claim 1, further comprising synchronizing the local account with authentication information maintained in the external computerized device.

5. The method according to claim 1, wherein the creating the local account is performed by copying the authentication information from the user account maintained in the external computerized device to make the local account a clone of the authentication information from the user account maintained in the external computerized device.

6. The method according to claim 1, further comprising receiving instructions to enable or disable use of local accounts from the external computerized device, and wherein the creating the local account is performed only in response to the local accounts being enabled.

7. The method according to claim 1, further comprising outputting, from the user interface device, an additional menu having options to self-administer a previously created local account.

8. The method according to claim 1, wherein the user interface device comprises one or more of a card reader, a wireless communication device, and a biometric device operatively connected to the processor device, and wherein the receiving the user identification information is performed by obtaining at least a portion of the user identification information from one or more of the card reader, the wireless communication device, and the biometric device.

9. The method according to claim 1, wherein the user interface device comprises a card reader operatively connected to the processor device, and wherein the method further comprises outputting, from the user interface device, an additional menu having options to self-register a user authentication card with the local account using the card reader.

10. The method according to claim 1, wherein the storing the local account comprises storing multiple local accounts, and wherein each of the local accounts stores authentication and rights information of a single user.

11. An apparatus comprising:
a processor device; and
a user interface device operatively connected to the processor device,
wherein the user interface device is adapted to receive user identification information,
wherein the processor device is adapted to receive external authorization to use features of the apparatus from an external computerized device based on the user identification information,
wherein, based on the external authorization, the user interface device is adapted to output a menu having options to create a local account and, in response, the user interface device is adapted to receive instructions to create the local account,
wherein the processor device is adapted to create the local account based on the instructions being received by cloning authentication information from a user account maintained in the external computerized device, and
wherein, after creation of the local account, the processor device is adapted to generate local authorization to use the features of the apparatus based on the user identification information matching information in the local account, without contacting the external computerized device.

12. The apparatus according to claim 11, wherein the processor device is adapted to de-authenticate the local account after expiration of a non-use time limit and require reauthentication.

13. The apparatus according to claim 11, wherein the processor device is adapted to create the local account only in response to the external authorization being received.

14. The apparatus according to claim 11, wherein the processor device is adapted to synchronize the local account with authentication information maintained in the external computerized device.

15. The apparatus according to claim 11, wherein the processor device is adapted to copy the authentication information from the user account maintained in the external computerized device when creating the local account to make the local account a clone of the authentication information from the user account maintained in the external computerized device.

16. The apparatus according to claim 11, wherein the processor device is adapted to receive instructions to enable or disable use of local accounts from the external computerized device, and wherein the processor device is adapted to create the local account only in response to the local accounts being enabled.

17. The apparatus according to claim 11, wherein the user interface device is adapted to output an additional menu having options to self-administer a previously created local account.

18. The apparatus according to claim 11, wherein the user interface device comprises one or more of a card reader, a wireless communication device, and a biometric device operatively connected to the processor device, and wherein the processor device is adapted to obtain at least a portion of the user identification information from one or more of the card reader, the wireless communication device, and the biometric device.

19. The apparatus according to claim 11, wherein the user interface device comprises a card reader operatively connected to the processor device, and wherein the user interface device is adapted to output an additional menu having options to self-register a user authentication card with the local account using the card reader.

20. The apparatus according to claim 11, further comprising a memory device adapted to store multiple local accounts, and wherein each of the local accounts stores authentication and rights information of a single user.

21. A multi-function device comprising:
a processor device;
at least one of a printing engine, an input/output device, and a scanning device operatively connected to the processor device, wherein the at least one of the printing engine, the input/output device, and the scanning device operating with the processor device cause the multi-function device to be adapted to perform at least one of printing, scanning, copying, and sending and receiving facsimiles; and
a user interface device operatively connected to the processor device,
wherein the user interface device is adapted to receive user identification information,
wherein the processor device is adapted to receive external authorization to use features of the multi-function device from an external computerized device based on the user identification information,
wherein, based on the external authorization, the user interface device is adapted to output a menu having options to create a local account and, in response, the user interface device is adapted to receive instructions to create the local account,
wherein the processor device is adapted to create the local account based on the instructions being received by cloning authentication information from a user account maintained in the external computerized device, and
wherein, after creation of the local account, the processor device is adapted to generate local authorization to use the features of the multi-function device based on the user identification information matching information in the local account, without contacting the external computerized device.

22. The multi-function device according to claim 21, wherein the processor device is adapted to de-authenticate the local account after expiration of a non-use time limit and require reauthentication.

23. The multi-function device according to claim 21, wherein the processor device is adapted to create the local account only in response to the external authorization being received.

24. The multi-function device according to claim 21, wherein the processor device is adapted to synchronize the local account with authentication information maintained in the external computerized device.

25. The multi-function device according to claim 21, wherein the processor device is adapted to copy the authentication information from the user account maintained in the external computerized device when creating the local account to make the local account a clone of the authentication information from the user account maintained in the external computerized device.

26. The multi-function device according to claim 21, wherein the processor device is adapted to receive instructions to enable or disable use of local accounts from the external computerized device, and wherein the processor device is adapted to create the local account only in response to the local accounts being enabled.

27. The multi-function device according to claim 21, wherein the user interface device is adapted to output an additional menu having options to self-administer a previously created local account.

28. The multi-function device according to claim 21, wherein the user interface device comprises one or more of a card reader, a wireless communication device, and a biometric device operatively connected to the processor device, and wherein the processor device is adapted to obtain at least a portion of the user identification information from one or more of the card reader, the wireless communication device, and the biometric device.

29. The multi-function device according to claim 21, wherein the user interface device comprises a card reader operatively connected to the processor device, and wherein the user interface device is adapted to output an additional menu having options to self-register a user authentication card with the local account using the card reader.

30. The multi-function device according to claim 21, further comprising a memory device adapted to store multiple local accounts, and wherein each of the local accounts stores authentication and rights information of a single user.

* * * * *